United States Patent [19]

Comroe

[11] 4,414,675

[45] Nov. 8, 1983

[54] MSK AND OK-QPSK SIGNAL DEMODULATOR

[75] Inventor: Richard A. Comroe, East Dundee, Ill.

[73] Assignee: Motorola, Inc., Schaumburg, Ill.

[21] Appl. No.: 290,276

[22] Filed: Aug. 5, 1981

[51] Int. Cl.³ .................... H04L 27/10; H04L 27/18
[52] U.S. Cl. .................................. 375/90; 329/112; 328/133
[58] Field of Search ........................ 375/45, 47, 49, 56, 375/88, 90, 94; 329/112; 328/133, 155

[56] References Cited

U.S. PATENT DOCUMENTS

| | | |
|---|---|---|
| 3,674,934 | 7/1972 | Gooding et al. . |
| 3,719,779 | 3/1973 | Wilson ................................. 375/45 |
| 3,743,775 | 7/1973 | Hutchinson et al. . |
| 3,930,121 | 12/1975 | Mathiesen ............................ 375/62 |
| 3,993,868 | 11/1976 | Balcewicz . |
| 4,028,490 | 6/1977 | Epstein ................................ 375/90 |
| 4,072,905 | 2/1978 | Keelty . |
| 4,076,956 | 2/1978 | Dogliotti et al. . |
| 4,087,752 | 5/1978 | Melvin . |
| 4,128,828 | 12/1978 | Samejima et al. . |
| 4,156,867 | 5/1979 | Bench . |
| 4,229,822 | 10/1980 | Bench . |
| 4,246,653 | 1/1981 | Malm . |
| 4,246,654 | 1/1981 | Malm . |
| 4,267,591 | 5/1981 | Wissel et al. . |
| 4,270,206 | 5/1981 | Hughes . |
| 4,324,001 | 4/1982 | Rhodes ................................ 375/47 |

OTHER PUBLICATIONS

Atobe et al., "One Solution for Constant Envelope Modulation", Fourth International Conference on Digital Satellite Communication, Montreal, Canada, (Oct. 23-25, 1978).
Coherent Demodulator—from IEEE Transactions on Communications, Jun. 1972, pp. 429 through 435.
The Effect of Tandem Band and Amplitude Limiting on the Eb/No Performance of Minimum (Frequency) Shift Keying (MSK), by H. Robert Mathwich—from Transactions on Communications, vol. COM-22, No. 10, Oct. 1974—pp. 1525 through 1539.
Digital Phase Sampling for Microcomputer Implementation of Carrier Aquisition & Coherent Tracking—from IEEE Trans. on Comm., vol. COM28, No. 8, Aug. 1980, by Charles R. Chan & Leimer.
Filtering in the Time and Frequency Domains—by Herman J. Blinchikoff and Anatol I. Zverev, (Westinghouse Electric Corporation), a Wiley Interscience Publication—pp. 72 and 73.
An Illustration of the MAP Estimation Method for Deriving Closed-Loop Phase Tracking Topologies: The MSK Signal Structure-by Richard W. D. Booth.

*Primary Examiner*—Benedict V. Safourek
*Assistant Examiner*—Stephen Chin
*Attorney, Agent, or Firm*—Rolland R. Hackbart; James W. Gillman

[57] ABSTRACT

An MSK or OK-QPSK data signal demodulator includes a filter and limiter for filtering and amplitude limiting the data signal, a timer for generating a timing signal indicating elapsed time and a microcomputer coupled to the limited data signal from the limiter and the timing signal from the timer. The microcomputer is interrupted by each transition of the limited data signal and stores the timing signal from the timer. An interrupt routine of the microcomputer extracts the clock offset, which is an estimate of the relative location of the bit boundaries, and the phase intercept, which is an estimate of the phase of the data signal at the bit boundaries, from the timing signals.

30 Claims, 8 Drawing Figures

MSK AND OK-QPSK SIGNAL DEMODULATOR

BACKGROUND OF THE INVENTION

The present invention relates generally to coded signal demodulators, and more particularly to a minimum shift-keyed and offset-keyed quadrature-phase-shift-keyed signal demodulator that may be advantageously utilized in data communication systems.

A type of frequency-shift-keying commonly referred to as minimum-shift-keying (MSK) is particularly well suited for use in radio communications systems since the spectral energy is more easily contained within the limited bandwidth available than other binary frequency or phase-shift-keying modulations. An MSK signal is a continuous-phase-frequency-shift-keying (CPFSK) between one signalling tone and another signalling tone depending on the value of a binary digit or bit. For example, a mark or binary one may be characterized by modulation with a 1200 Hz signalling tone, and a space or binary zero may be characterized by modulation with an 1800 Hz signalling tone. The continuous phase in CPFSK indicates that the phase at frequency changes between the two signalling tones is continuous, i.e., a signalling tone begins at the same phase that the previous signalling tone ended with.

Also, to be MSK, the deviation ratio of the CPFSK must be equal to one-half. The deviation ratio is the frequency difference between the two signalling tones divided by the rate of transmission of the bits expressed in bits per second. In the above example of CPFSK with signalling tones of 1200 Hz and 1800 Hz, the transmission speed would be 1200 bits per second to be MSK.

Since MSK is a member of the frequency-shift-keying (FSK) family, the bits can be recovered from the MSK modulated signal by using any FSK signal detector or demodulator. In binary FSK one of two signalling tones are transmitted to indicate one of two possible values for a binary digit or bit. A device which discriminates between the two signalling tones can be employed as a signal detector, such as a frequency discriminator, the error voltage from a phase-locked loop, or a delay differential detector. All three methods are in common use as MSK signal detectors.

Better signal detectors can be constructed for MSK which advantageously exploit its unique characteristics, i.e., continuous phase and deviation ratio equal to one-half. These two properties result in phase characteristics usually found in a certain type of phase-shift keying (PSK) modulation called offset-keyed quadrature-phase-shift keying (OK-QPSK). Although OK-QPSK modulation encodes the data bits as phase shifts of the signal at bit boundaries relative to a reference carrier rather than the frequency of the signalling tone as in FSK, a relationship between the two methods exists. Because of this characteristic, coherent OK-QPSK signal detectors are also commonly used as signal detectors for MSK. Coherent signal detectors achieve more reliable signal detection than the three non-coherent detectors described earlier. This is because coherent detectors use knowledge of the exact phase of the signalling tones to detect the transmitted bits. As such, this type of demodulator usually consists of two parts; a device which extracts the bit clock and the phase of the signalling tones, and a detector which uses the extracted signal phase. A detector which uses knowledge of the signal phase is commonly implemented by a device called a matched filter.

All of these MSK demodulators can be built with varying amounts of hardware. The more reliable coherent demodulators usually require much more hardware than the simpler non-coherent demodulators. Some of the demodulators can be implemented using digital or discrete-time techniques. However, the faster the transmission rate or the more complex the demodulator, the costlier it becomes. As a result, with existing techniques, a coherent demodulator can not be implemented by one low cost microcomputer while accomodating data transmission speeds over several hundred bits per second.

SUMMARY OF THE INVENTION

Accordingly, it is the object of the present invention to provide a reliable and relatively inexpensive MSK and OK-QPSK data signal demodulator that is easily adaptable to accomodate different modulating tones and baud rates.

It is another object of the present invention to provide a reliable MSK and OK-QPSK data signal demodulator that need only operate at discrete times coinciding with zero crossings of the data signal.

It is yet another object of the present invention to provide a reference carrier recovery process and extraction apparatus for MSK and OK-QPSK data signals that can operate at discrete times at baud rates of several thousand bits per second.

It is also an object of the present invention to provide a reliable coherent MSK and OK-QPSK data signal detector that operates at the same discrete times, given the phase of the carrier reference.

It is yet another object of the invention to provide the same reliable demodulation for either MSK or OK-QPSK modulated signals.

According to an embodiment of the present invention, a demodulator is responsive to zero crossings of a data signal modulated according to MSK or OK-QPSK for recovering the binary data carried thereon. Each bit of the modulated data signal consists of one of two signalling tones having a frequency difference that is one-half of the bit rate. In the inventive demodulator, the data signal is filtered and limited transforming the zero crossings into transitions between binary states of a limited data signal. A microcomputer is responsive to each transition of the limited data signal for storing a timing signal from a free running timer, which operates at a frequency equal to an integer multiple of the bit rate of the data signal. The timing signals stored for each transition of the data signal are utilized to extract a phase intercept signal, which is an estimate of the phase of the data signal at bit boundaries, and a clock offset signal, which is an estimate of the relative location of the bit boundaries with respect to the timing signal from the timer. Assuming a reference carrier that has a frequency midway between the frequencies of the two MSK or OK-QPSK signalling tones and a phase advancing by 90° for every bit, the time between the rising or falling transitions of the limited data signal and the closest rising transition of the reference carrier signal is directly proportional to the phase shift therebetween. A binary phase state for each bit of the data signal can be ascertained by selecting the transition of the limited data signal that is closest to the bit edge of the data signal and generating a phase shift relative to the reference carrier signal from the timing signal for the selected transition. If the generated phase shift has a magnitude close to the magnitude of the phase intercept signal, a first phase state is generated for a bit; and if the generated phase shift has a magnitude close to the magnitude of the phase intercept signal shifted by 180°, a second phase state is generated for a bit. The first and second phase states may be used to recover the binary states of the data carried by the data signal, depending on whether the data signal was modulated by MSK or OK-QPSK. The present invention not only encompasses inventive apparatus for an MSK and OK-QPSK signal demodulator, but also an inventive process for recovering MSK and OK-QPSK signals.

DETAIL DESCRIPTION OF THE PREFERRED EMBODIMENT

Figure 1:
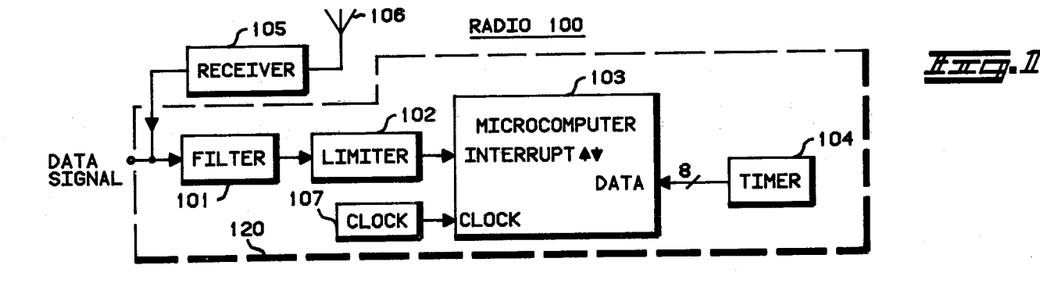
FIG. 1 is a block diagram of a radio which may advantageously utilize the demodulator of the present invention.

In FIG. 1, there is illustrated a portion of a radio 100 that may advantageously utilize demodulator 120 embodying the present invention for receiving MSK and OK-QPSK data signals from a remotely located base station. The radio 100 may be any conventional radio utilized in radio communication systems where binary data is communicated between a base station and portable, mobile or fixed-location radios. For example, radio 100 could be the type of radio described in Motorola Instruction Manual No. 68P81014C65, entitled "RDX 1000 Portable RF Data Terminals", published by the Portable Products Division of Motorola, Inc., Ft. Lauderdale, Fla., 1978, or the type of radio described in Motorola Instruction Manual No. 68P81015E70, entitled "25/45/75/100W, 12VDC Mobile with Sensitron Receiver," published by Motorola Service Publications Department, Schaumburg, Ill., 1978, which may be used together with the data terminal described in Motorola Instruction Manual No. 68P81036E90, entitled "MODAT Mobile Data Terminal Multi-Line Display", published by Motorola Service Publications Department, Schaumburg, Ill., 1977.

In the receiving portion of radio 100, an FM signal received by antenna 106 is demodulated by FM receiver 105 which provides the data signal to demodulator 120. The data signal is then filtered by filter 101 to remove noise and interference and applied to an amplitude limiter 102. Limiter 102 transforms the data signal into the hard limited signal illustrated by waveform 202 in FIG. 2.

The hard limited data signal from limiter 102 is applied to the interrupt input of microcomputer 103, which demodulates the data signal in accordance with the present invention. Microcomputer 103 may also provide the various control functions necessary for radio 100. Most conventional radios, such as those described in the aforementioned instruction manuals, utilize microcomputers for providing necessary control functions due to their processing power and flexibility.

Microcomputer 103 is also coupled to clock oscillator 107 and timer 104. Clock oscillator 107 has a frequency determining the speed of operation of microcomputer 103. Timer 104 provides an eight-bit output signal indicating elapsed time. Timer 104 has a frequency selected such that its eight-bit output signal overflows at the bit rate of the data signal. For example, time 104 may be an eight-stage binary counter operated at eight times the bit rate (or baud rate) of the data signal. Furthermore, timer 104 may be derived from clock oscillator 107 by appropriate chain of dividers. Timer 104 and clock oscillator 107 may also be internal components of microcomputer 103, a feature of some commercially available microcomputers, such as the Motorola type MC6801 microcomputer described in the Motorola reference manual entitled, "MC6801 8-Bit Single-Chip Microcomputer", published by Microprocessor Operations, Austin, Tex., in 1980. If the internal timer of a conventional microcomputer is utilized for timer 104, the frequency of clock oscillator 107 must be selected such that timer 104 overflows at a binary multiple of the bit rate of the data signal.

Figure 2:
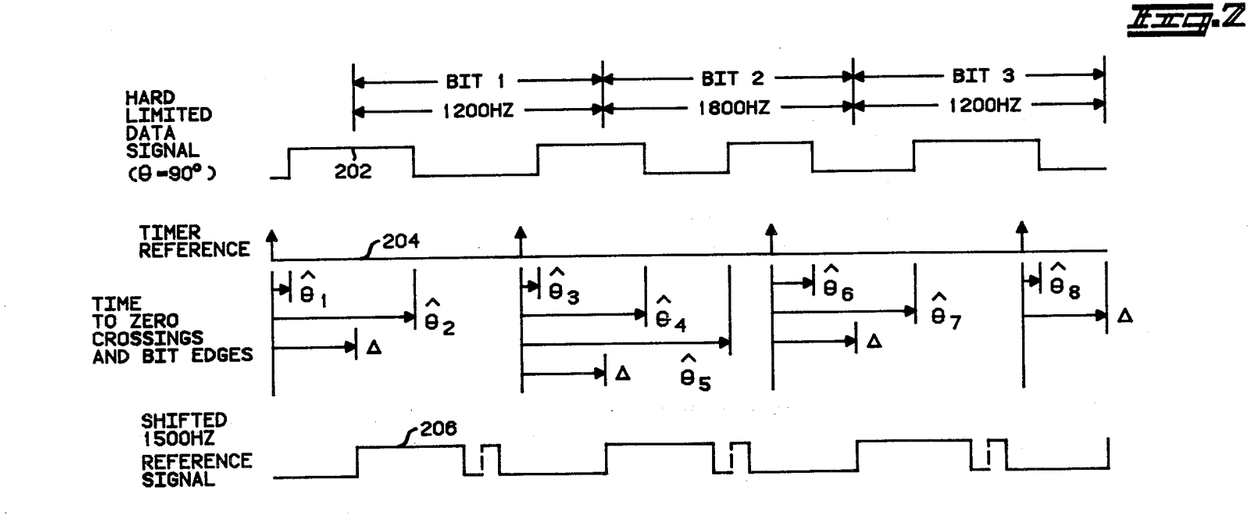
FIG. 2 illustrates the waveforms for signals provided by selected blocks in FIG. 1 for one possible value of phase intercept, $\theta$.

In practicing the present invention, microcomputer 103 is interrupted by both rising and falling edges of the hard limited data signal, which rising and falling edges correspond to zero crossings of the data signal from receiver 105. The inventive demodulator of the present invention need only detect zero crossings since the zero crossings of MSK and OK-QPSK data signals contain all of the necessary information for recovering the binary data carried thereon. Microcomputer 103 ascertains the location of each zero crossing of the data signal by storing the elapsed time indicated by the eight-bit output signal of timer 104 in response to each interrupt. The elapsed time that is stored for each zero crossing of the data signal determines the location of each zero crossing with respect to timer 104. In FIG. 2, the timer reference waveform 204 indicates the point at which timer 104 overflows. The elapsed time for each transition of waveform 202 for the hard limited data signal is indicated $\theta_1$ through $\theta_8$ in FIG. 2. The elapsed times indicated by $\theta_1$ through $\theta_8$ in FIG. 2 are simply the value of the eight-bit binary output signal from timer 104 at the respective zero crossing. Also illustrated in FIG. 2 in the clock offset, $\Delta$, which is the elapsed time between the overflow of timer 104 and the bit boundaries or beginning of each bit of the data signal. The inventive demodulator of the present invention need only utilize the elapsed times $\theta_x$ for each zero crossing of the data signal in order to recover the clock offset and the phase intercept of the data signal. Once the clock offset and phase intercept of the data signal have been determined, the inventive demodulator of the present invention can then detect the binary phase state of each bit of the data signal.

The phase intercept of the data signal is the phase distortion of the data signal with respect to the beginning of each bit. The data signal may have been generated with phase distortion, or phase distortion may have been introduced when transmitting the data signal through a transmission medium, such as an RF channel. The hard limited data signal illustrated by waveform 202 in FIG. 2 has a phase intercept of 90°. That is, for waveform 202 in FIG. 2, the phase of the 1200 Hz signal in bit one is 90° at the beginning of bit one, the phase of the 1800 Hz signal in bit two is 90° at the beginning of bit two, and the phase of the 1200 Hz signal in bit three is −90° at the beginning of bit three. For phase-shift-keying modulations such as OK-QPSK, the phase intercept is commonly referred to as the reference carrier phase. The characterization and effects of phase distortion are described in further detail in the text by Blinchikoff and Zverev, entitled, "Filtering in the Time and Frequency Domains", published by John Wiley and Sons, Inc., in 1976, at pages 72 and 73. Since the inventive demodulator of the present invention takes into account the phase intercept of the data signal, the data signal can be demodulated regardless of the value of the actual phase intercept.

Figure 3:
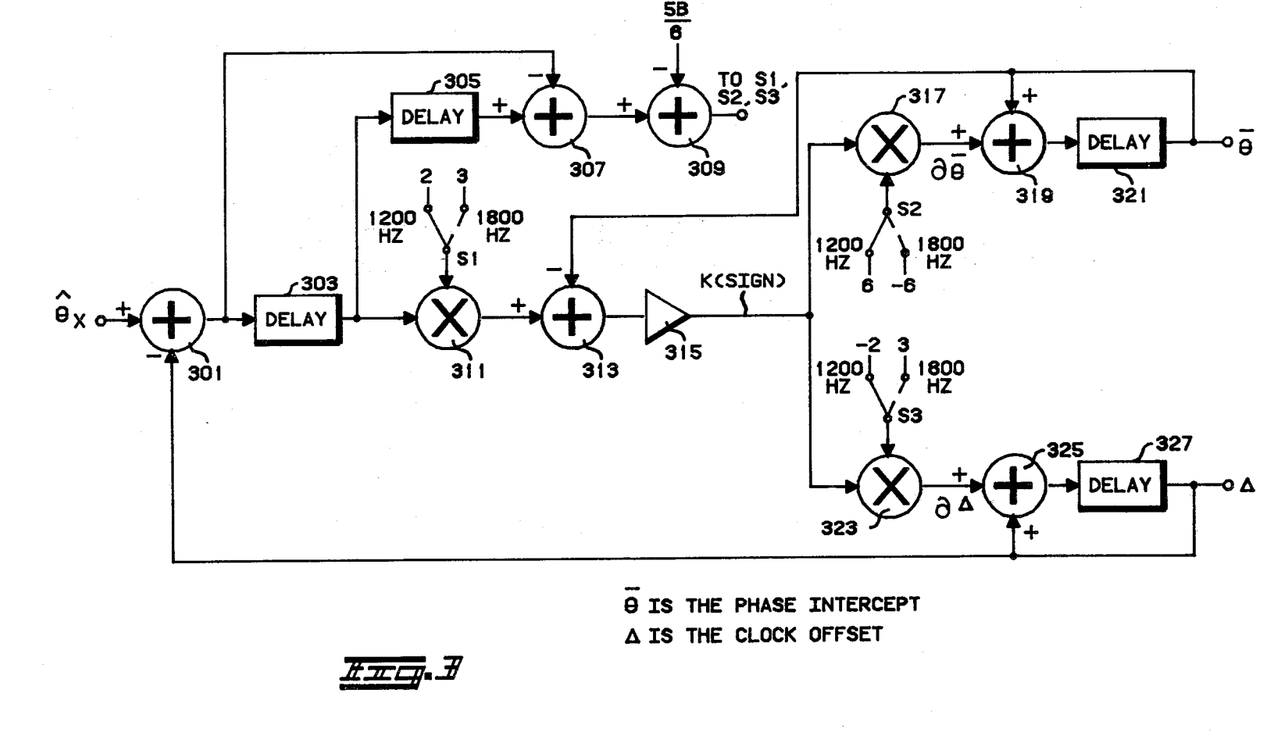
FIG. 3 is a block diagram of the circuitry necessary to generate the phase intercept and clock offset.

Estimates of the phase intercept $\hat{\theta}$ and clock offset $\Delta$ can be determined from the elapsed time, $\hat{\theta}_x$ for each zero crossing by utilizing the extraction apparatus illustrated in FIG. 3. For the extraction apparatus in FIG. 3, the data signal has a frequency of 1200 Hz for binary one bits and a frequency of 1800 Hz for binary zero bits. Since the ratio of the 1200 Hz frequency to the 1800 Hz frequency is two to three, the relationship between the elapsed time from the beginning of each bit to the first zero crossing is the inverse of the ratio of the two frequencies or three to two. This relationship can be expressed by the following equation:

$$3(\theta_{1800} - \Delta) = 2(\theta_{1200} - \Delta) \tag{1}$$

Solving equation one for the clock offset $\Delta$ results in the following equation:

$$3\theta_{1800} - 2\theta_{1200} = \Delta \tag{2}$$

Thus by measuring the elapsed time for $\theta_{1800}$ and $\theta_{1200}$ with respect to timer 104, the clock offset $\Delta$ can be computed. However, $\theta_{1200}$ and $\theta_{1800}$ were defined as only the first MSK zero crossings in the bit. Next, let $\hat{\theta}_{1200}$ and $\hat{\theta}_{1800}$ be any zero crossing:

Then
$$\hat{\theta}_{1200} = \theta_{1200} + nB/2, \; n = 0,1,2,\ldots; \tag{3}$$
and
$$\hat{\theta}_{1800} = \theta_{1800} + mB/3, \; m = 0,1,2,\ldots; \tag{4}$$

where B is the interval between bits

If n=0 corresponds to the first zero crossing in a bit, then n=1 corresponds to the second zero crossing, ½ bit later than $\theta_{1200}$, or ⅓ bit later than $\theta_{1800}$. Now using any MSK zero crossing:

$$3\hat{\theta}_{1800} - 2\hat{\theta}_{1200} = \tag{5}$$
$$3(\theta_{1800} + mB/3) - 2(\theta_{1200} + nB/2)$$
$$3\theta_{1800} - 2\theta_{1200} = \tag{6}$$
$$3\theta_{1800} - 2\theta_{1200} + (m + n)B$$
$$3\hat{\theta}_{1800} - 2\hat{\theta}_{1200} = \Delta + (m - n)B \tag{7}$$

Since n and m are integers, this result differs from the previous result by an integer number of bit intervals.

When modulo B arithmetic is used, the extra term (m−n)B disappears.

At this point a system has been described which has the elapsed time of zero crossings as inputs and produces the clock offset $\Delta$ and phase intercept $\bar{\theta}$ as outputs. For the first zero crossing in each bit, the phase intercept $\bar{\theta}$ is equal to either side of equation (1). Generalizing both sides of equation (1) for any zero crossing, results in the following:

$$2(\hat{\theta}_{1200} - \Delta) = 2(\theta_{1200} - \Delta + nB/2) \tag{8}$$
which reduces to;
$$2(\hat{\theta}_{1200} - \Delta) = \bar{\theta} + nB \tag{9}$$
and likewise;
$$3(\hat{\theta}_{1800} - \Delta) = 3(\theta_{1800} - \Delta + mB/3) \tag{10}$$
which reduces to;
$$3(\hat{\theta}_{1800} - \Delta) = \bar{\theta} + mB \tag{11}$$

Now, assume a change in the elapsed time for $\hat{\theta}_{1800}$ of $\partial\hat{\theta}_{1800}$:
$$3(\hat{\theta}_{1800} + \partial\hat{\theta}_{1800} - \Delta) = \bar{\theta} + mB \tag{12}$$
$$3\partial\hat{\theta}_{1800} = -3(\hat{\theta}_{1800} - \Delta) + \bar{\theta} + mB \tag{13}$$

Also, in a like manner a change in the elapsed time for $\hat{\theta}_{1200}$ of $\partial\hat{\theta}_{1200}$ results in:

$$2\partial\hat{\theta}_{1200} = -2(\hat{\theta}_{1200} - \Delta) + \bar{\theta} + nB \tag{14}$$

Now, for a change in either $\hat{\theta}_{1200}$ or $\hat{\theta}_{1800}$, the change in the phase intercept $\bar{\theta}$ or clock offset $\Delta$ can be determined by taking the corresponding partial derivatives.

The following partial derivatives of the clock offset $\Delta$ of equation (7) are:

$$\partial\Delta/\partial\hat{\theta}_{1800} = 3; \; \partial\Delta/\partial\hat{\theta}_{1200} = -2 \tag{15}$$

Next, the partial derivatives of the phase intercept are obtained as follows:

$$2(\hat{\theta}_{1200} - \Delta) = \bar{\theta} + nB \tag{16}$$
$$2(\theta_{1200} - [3\theta_{1800} - 2\theta_{1200} - (m - n)B]) = \bar{\theta} + nB \tag{17}$$
$$6\theta_{1200} - 6\theta_{1800} - 2(m - n)B = \bar{\theta} + nB \tag{18}$$
$$\partial\bar{\theta}/\partial\hat{\theta}_{1800} = -6; \; \partial\bar{\theta}/\partial\hat{\theta}_{1200} = 6 \tag{19}$$

For the first zero crossing in a bit, the incremental change in the phase intercept is:

$$2\partial\hat{\theta}_{1200} = 2(\hat{\theta}_x - \Delta) - \bar{\theta} \text{ for } \hat{\theta}_{1200} \tag{20}$$
and
$$3\partial\hat{\theta}_{1800} = 3(\hat{\theta}_x - \Delta) - \bar{\theta} \text{ for } \hat{\theta}_{1800} \tag{21}$$

In the apparatus of FIG. 3, equations (20) and (21) are equivalent to the output signal from adder 313. In order to limit the maximum correction due to a single zero crossing, an amplitude limiter, such as 315 in FIG. 3, can be used. Limiter 315 limits the maximum correction to plus or minus K depending upon whether the output signal from adder 313 is positive or negative. The value of K determines the size of the correction and consequently the loop bandwidth. For the preferred embodiment, K was selected to be one-half.

The correction to the phase intercept $\bar{\theta}$ is determined by equations (19) which may be written as:

$$\partial\bar{\theta} = -6K[\text{SIGN}(\partial\hat{\theta}_{1800})] \tag{22}$$
$$\partial\bar{\theta} = +6K[\text{SIGN}(\partial\hat{\theta}_{1200})] \tag{23}$$

In the apparatus of FIG. 3, equations (22) and (23) are equivalent to the output signal from multiplier 317. The corrections to the phase intercept from equations (22) and (23) are then added to the present value of the phase intercept to provide the new value of the phase intercept, per the following equation.

$$\bar{\theta} = \bar{\theta} + \partial\bar{\theta} \qquad (24)$$

In FIG. 3, the present value of the phase intercept is stored in delay stage 321, and equation (24) is equivalent to the output of adder 319.

The same process is repeated for the correction to the clock offset $\Delta$ and is characterized by the following equations.

$$\partial\Delta = +3K[SIGN(\partial\hat{\theta}_{1800})] \qquad (25)$$
$$\partial\Delta = -2K[SIGN(\partial\hat{\theta}_{1200})] \qquad (26)$$
$$\Delta = \Delta + \partial\Delta \qquad (27)$$

In the apparatus in FIG. 3, equations (25) and (26) are equivalent to the output of multiplier 323, and equation (27) is equivalent to the output of adder 325. Delay stage 327 provides the present clock offset $\Delta$.

In order to determine which of the 1200 Hz or 1800 Hz constants is to be used in equations (20) to (26), the interval between successive zero crossings can be measured. If the length of a bit interval is B, the interval between successive zero crossings of the 1200 Hz signal is B/2, and the interval between the successive zero crossings of the 1800 Hz signal is B/3. A decision threshold could be placed midway between B/2 and B/3 at 5B/12. However, the interval from the last zero crossing can be ambiguous when there has been a change in signalling tone. To minimize this ambiguity, the present zero crossing may be compared with the the second previous zero crossing so that the comparison is made over two zero crossing intervals instead of one. In this case, two intervals of the 1200 Hz signal would be B, and the 1800 Hz signal would be 2B/3. The threshold may then be set at 5B/6. This feature of the present invention is illustrated in FIG. 3, where two delay stages, 303 and 305, are utilized for storing the output from adder 301 for the two previous zero crossings. Adder 307 then compares the elapsed time stored in delay stage 305 with the elapsed time from adder 301 for the present zero crossing. Next, adder 309 subtracts 5B/6 from the output from adder 307 and enables switches S1, S2 and S3 if the output from adder 309 is greater than or equal to zero, causing switches S1, S2 and S3 to select the 1200 Hz constants. If the output from adder 309 is less than zero, switches S1, S2 an S3 are enabled to select the 1800 Hz constants. The selection of either 1200 Hz constants or 1800 Hz constants is valid with respect to the elapsed time for the previous zero crossing stored in delay stage 303. Therefore, the elapsed time stored in delay stage 303 is coupled to adder 311 for updating the values of the phase intercept $\bar{\theta}$ and the clock offset $\Delta$.

Figure 4:
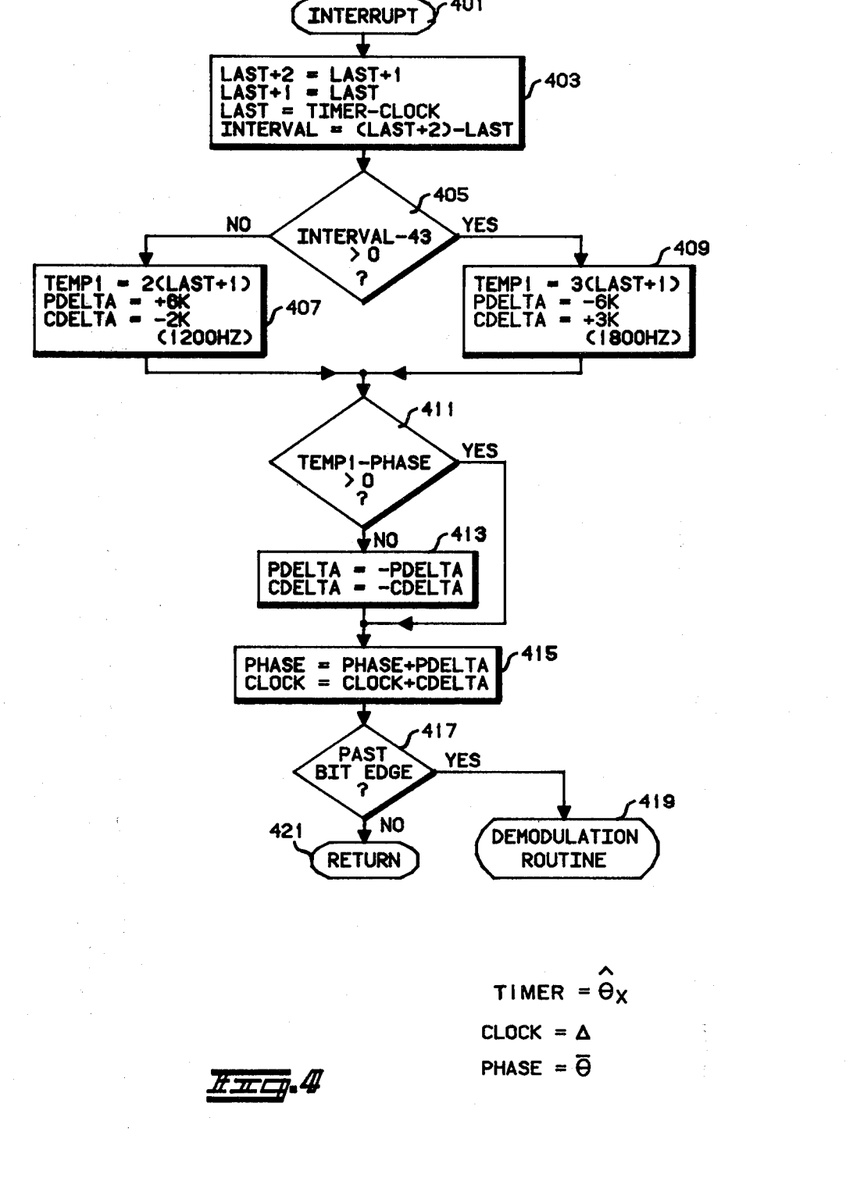
FIG. 4 is a flow chart for the interrupt routine that is executed by the microcomputer in FIG. 1 in response to each zero crossing of the data signal.

The generation of the phase intercept $\bar{\theta}$ and the clock offset $\Delta$ provided by the extraction apparatus in FIG. 3 may also be provided by microcomputer 103 in FIG. 1 programmed according to the flow chart of FIG. 4. The flow chart in FIG. 4 provides a detailed description of the process steps necessary for implementing the functions provided by the apparatus of FIG. 3 in microcomputer 103. The coding of the process steps of the flow chart of FIG. 4 into the appropriate instructions of a suitable conventional microcomputer 103 is a mere mechanical step for one skilled in the art. For example, the BASIC language program in the Appendix hereinbelow is one example of a suitable program for the flow chart of FIG. 4.

The flow chart of FIG. 4 is executed by microcomputer 103 in FIG. 1 whenever an interrupt is generated in response to a transition of the hard limited data signal from limiter 102. Since each transition of the hard limited data signal corresponds to a zero crossing of the data signal from receiver 105, microcomputer 103 is interrupted for each zero crossing of the data signal. Proceeding from interrupt block 401 to block 403, the present and two preceding elapsed times are stored by the variables LAST, LAST+1 and LAST+2. The variable CLOCK is the clock offset, and the variable PHASE is the phase intercept. A variable TIMER is the eight-bit output signal that is read in by microcomputer 103 from timer 104. The variable TIMER indicates the elapsed time from the overflow of timer 104 to the present zero crossing. In block 403, the variable LAST is computed by subtracting the variable CLOCK from the variable TIMER, providing an elapsed time from the bit boundary or beginning of the present bit. The variable INTERVAL is formed by subtracting LAST+2 from LAST and is utilized to select either 1200 Hz or 1800 Hz constants.

Proceeding to decision block 405, a constant 43 is subtracted from the variable INTERVAL to determine whether 1200 Hz or 1800 Hz constants are to be used. Since the eight-bit binary output from timer 104 in FIG. 1 is treated as an eight-bit signed number, timer 104 counts from zero to +127 and then from −128 back to zero. Thus, the interval B is 256 counts long, but extends over positive numbers for the first half of the interval and negative numbers for the second half of the interval. Therefore, at decision block 405, the constant 5B/6 corresponds to −43 or −B/6.

If the results from decision block 405 are greater than zero, YES path is taken to block 409 where variables TEMP1, PDELTA and CDELTA are set using 1800 Hz constants. Alternatively, if the result from decision block 405 is less than or equal to zero, NO path is taken to block 407 where the variables TEMP1, PDELTA and CDELTA are set using 1200 Hz constants.

Next, at decision block 411, the variable TEMP1 is compared to the variable PHASE, and, if the variable TEMP1 is greater than the variable PHASE, the sign of PDELTA and CDELTA is changed at block 413. Alternatively, if the variable TEMP1 is greater than the variable PHASE, YES path is taken to block 415, and the sign of PDELTA and CDELTA is not changed.

At block 415, the variables PHASE and CLOCK are updated by adding the incremental values PDELTA and CDELTA to the corresponding previous values. Next, at decision block 417, a check is made to determine if the present zero crossing is the first zero crossing past the bit boundary or beginning of a bit. If the present zero crossing is the first zero crossing in a bit, YES path is taken to block 419 where program control is transferred to the demodulation routine in FIG. 5. Otherwise, NO path is taken to block 421 where program control returns from the interrupt routine. The first zero crossing past the beginning of a bit can be determined by comparison of the variable LAST with LAST+1. Alternatively, an internal counter can be set to overflow at the beginning of each bit by synchronizing the internal counter with the clock offset CLOCK.

Each of the process steps in the flow chart of FIG. 4 corresponds substantially identically to blocks of the apparatus in FIG. 3. In the preferred embodiment of the present invention, microcomputer 103 has been programmed to execute the process steps of the flow chart in FIG. 4. Therefore, when different signalling tones are utilized, only the programming of microcomputer 109 need be changed to accommodate the new signalling tone frequencies. In contrast, circuitry modifications to the apparatus in FIG. 3 would be required to accommodate new signalling tones.

Figure 5:
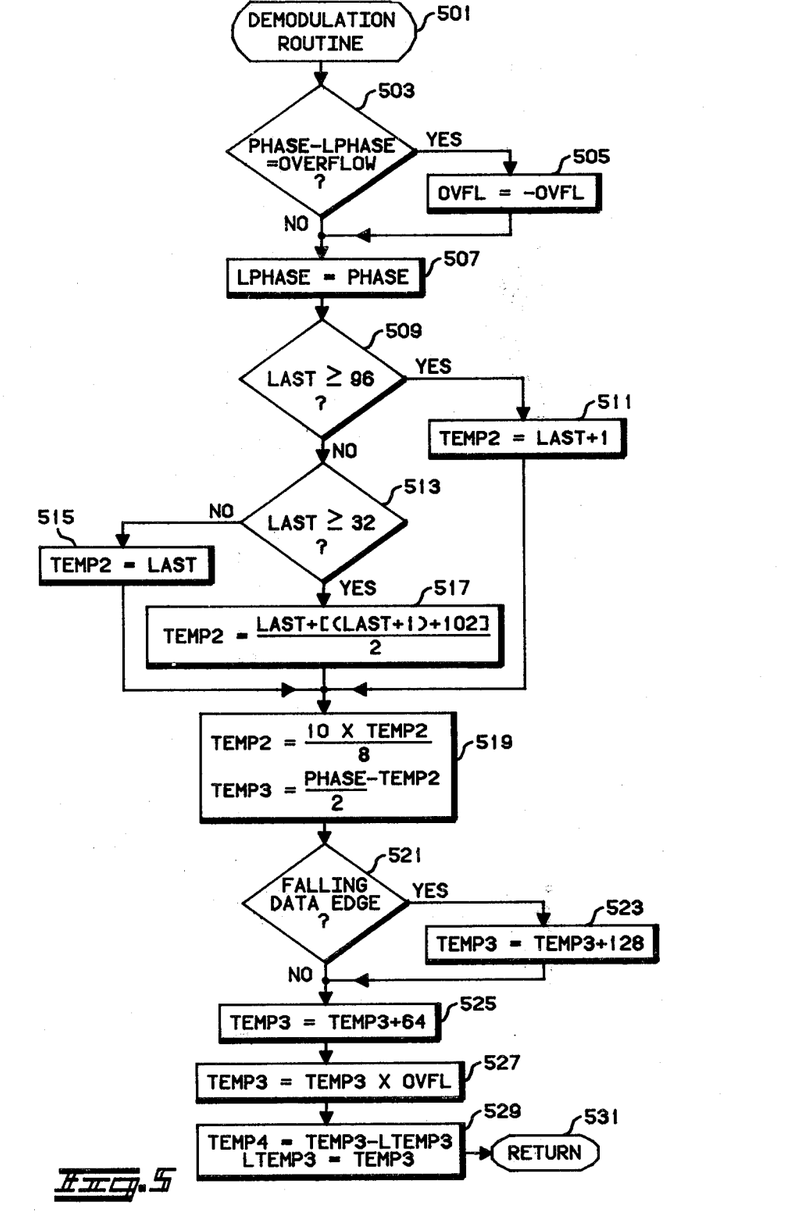
FIG. 5 is a flow chart of the demodulation routine that is called from the interrupt routine in FIG. 4 in response to the first zero crossing of the data signal that occurs past the start of each bit thereof.

Once the phase intercept PHASE and the clock offset CLOCK have been generated, the binary states of the data signal can be detected by utilizing the demodulation routine in FIG. 5. A suitable BASIC language program for the flowchart of the demodulation routine in FIG. 5 is also included in the Appendix hereinbelow. The demodulation routine of FIG. 5 is entered at block 501 in response to the first zero crossing past the beginning of a bit. Thus, the demodulation routine in FIG. 5 need only be executed by microcomputer 103 in FIG. 1 one time per bit. The data signal is coherently detected by comparison of the phase of the data signal at the first zero crossing in a bit to an assumed 1500 Hz reference carrier. The 1500 Hz reference carrier is assumed to have a phase of zero degrees, i.e., a rising transtition at the beginning of each bit, as illustrated by waveform 206 in FIG. 2. In other words, the 1500 Hz reference carrier is assummed to change phase by 90° every bit. By utilizing this feature of the present invention, demodulation of the data signal is greatly simplified since the elapsed time from the rising transition of the 1500 Hz reference carrier to the closest rising transition of the data signal is directly proportional to the phase shift therebetween. Similarly, the elapsed time from the rising transition of the 1500 Hz reference carrier to the closest falling transition of the data signal is proportional to the phase shift therebetween plus a constant of 180°.

Assuming that both a 1200 Hz signal and 1500 Hz reference carrier have a phase of 0° at the beginning of a bit, the phase shift between them will be 0° at the end of the bit. This is because the phase shift between 1200 Hz signal and 1500 Hz reference carrier increases by 90° over the bit and the 1500 Hz reference is retarded by 90° in the middle of the bit.

Likewise, if an 1800 Hz signal and 1500 Hz reference carrier have a phase of 0° at the beginning of a bit, the phase shift between them will be 180° at the end of the bit. This is because the phase shift between the 1800 Hz signal and the 1500 Hz reference carrier decreases by 90° over the bit and the 1500 Hz reference is retarded by 90° in the middle of the bit. However, since the phase intercept of the data signal is not necessarily zero degrees at the beginning of each bit, the phase intercept PHASE generated by the interrupt routine in FIG. 4 must be taken into account when generating the phase shift of the data signal at the zero crossing nearest the beginning of a bit.

Figure 6:
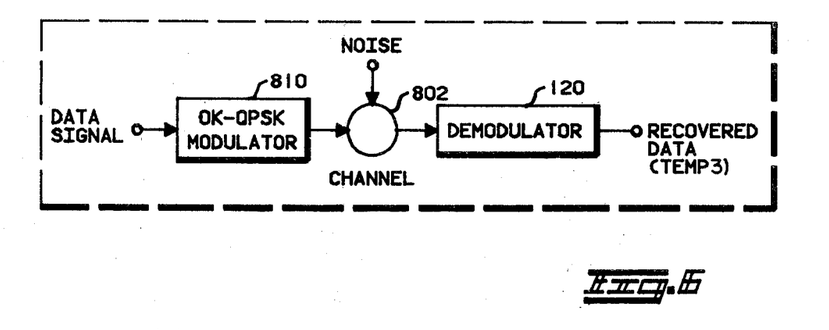
FIG. 6 illustrates a communications system employing the demodulator in FIG. 1 to recover an OK-QPSK data signal.

Therefore, if the phase shift of the data signal at the zero crossing nearest the beginning of a bit is 0° with respect to the phase intercept, a first phase state is detected. Similarly, if the phase shift of the data signal at the zero crossing nearest the beginning of a bit is ±180° with respect to the phase intercept, a second phase state is detected. These phase states correspond to the binary states of the detected data when the data signal is encoded as phase shifts at bit boundaries relative to a reference carrier. Because there is a possible 180° phase ambiguity in the 1500 Hz reference carrier, there may be an inversion of the binary state of the recovered data. If the data signal is OK-QPSK encoded, as in the OK-QPSK data communication system in FIG. 6, the binary state of the recovered data is the sign bit of the variable TEMP3 developed by the demodulation routine in FIG. 5. A conventional OK-QPSK signal modulator 810 modulates the data signal for transmission over communication channel 802 to demodulator 120. The communication channel 802 may be any conventional channel capable of carrying data signals, such as a radio channel, and is generally subject to noise interference.

Figure 7:
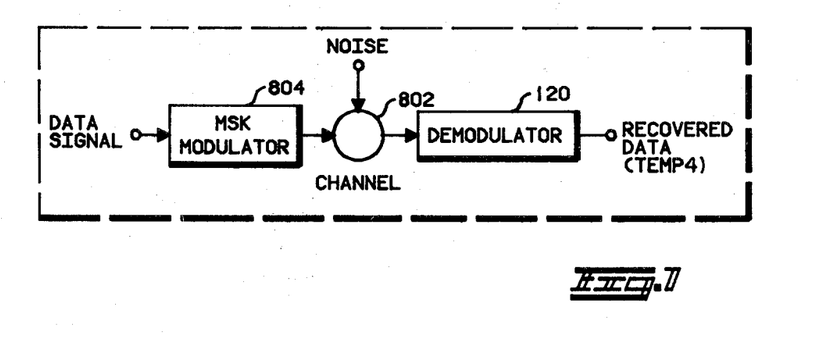
FIG. 7 illustrates a communications system employing the demodulator in FIG. 1 to recover an MSK data signal.

Since the frequency of the data signal is reflected in the change in phase across a bit, binary states of an MSK data signal may be determined by taking the difference between adjacent detected phase shifts or the exclusive-OR of adjacent phase states. This difference taking operation is performed at block 529 in FIG. 5, where the variable TEMP4 is set equal to the variable TEMP3 less the variable LTEMP3. However, this difference-taking operation of the detected phase shifts for recovering the binary states of an MSK data signal degrades performance somewhat because errors in the detected phase states are amplified. An MSK data communication system exemplifying this operation is shown in FIG. 7 where a conventional MSK modulator 804 modulates the data signal for transmission over communication channel 802 to demodulator 120. The binary state of the data recovered by demodulator 120 is the sign bit of the variable TEMP4 developed by the demodulation routine in FIG. 5.

Figure 8:
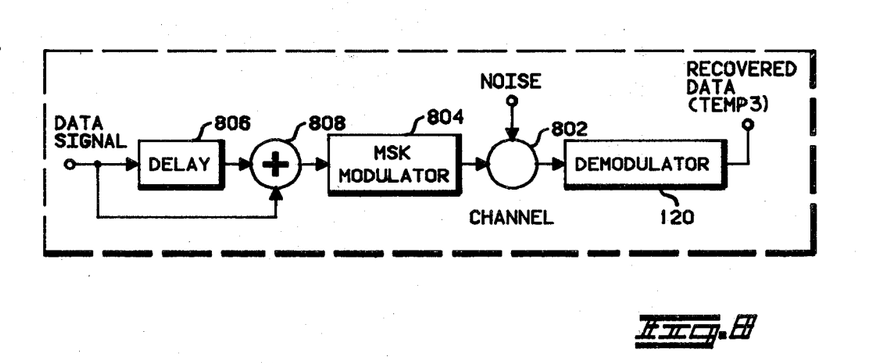
FIG. 8 illustrates another communications system employing the demodulator in FIG. 1 to recover a precoded MSK data signal.

The performance degradation due to the difference-taking operation can be circumvented by performing the difference taking operation before the MSK encoding operation, i.e., pre-coding the data signal by taking the exclusive-OR of adjacent data bits and then MSK encoding the precoded data signal. This has the effect of encoding the data states into phase states. Then the detected phase states correspond directly with the binary states of the recovered data. This method also results in a potential inversion of the binary states of the recovered data. An MSK data communication system exemplifying this operation is shown in FIG. 8. A delay stage 806 and exclusive-OR gate 808 precode the data signal before application to MSK modulator 804. In this case, the binary state of the data recovered by demodulator 120 is the sign bit of the variable TEMP3 developed by the demodulation routine in FIG. 5.

Referring to FIG. 5, the demodulation routine is entered at block 501 in response to the first zero crossing in a bit. Proceeding to decision block 503, the variable PHASE representing the phase intercept of the present zero crossing is compared to the variable LPHASE representing the phase intercept of the previous zero crossing. The phase intercept may have changed sign between bits resulting in a phase discontinuity, i.e., the phase intercept switches from +90° to −90° or vice versa. This is because the phase intercept varies over the range from 0° to +90° and −90° to 0°. When a phase discontinuity occurs, the difference between the variable PHASE and the variable LPHASE is either less than −128 or greater than or equal to +128, indicating an overflow. If the phase discontinuity occurs, YES branch is taken to block 505 where the sign of the variable OVFL is changed. The variable OVFL is either plus or minus one, changing sign when a phase discontinuity is detected. The variable OVFL is used later at block 527 for changing the sign of the variable TEMP3. If no phase discontinuity has occurred, NO branch is taken to block 507 where the variable LPHASE is set to the value of the present variable PHASE.

Next, the variable LAST is examined to determine its distance from the zero crossing. If LAST is greater than or equal to 96, YES branch is taken from decision block 509 to block 511 where the variable TEMP2 is set to be equal to the previous zero crossing LAST+1. Otherwise, NO branch is followed from decision block 509 to decision block 513. At decision block 513, if LAST is less than 32, NO branch is taken to block 515 where the variable TEMP2 is set to be equal to the variable LAST, the present zero crossing. Otherwise, YES branch is taken from decision block 513 to block 517 where an average is taken between the variables LAST and LAST+1. Since the variable LAST+1 is representative of a zero crossing occurring before the beginning of the present bit, a constant 102 is added to the variable LAST+1, for adding a quantity equal to Pi in terms of the 1500 Hz reference carrier. Thus, the variable TEMP2 is set to be one-half of the sum of LAST and LAST+1 shifted by 180°.

Next at block 519, the variable TEMP2 is adjusted by a factor of 10/8 since the period of the 1500 Hz reference carrier is 8/10 of a bit interval. Also at block 519, the variable TEMP2 is subtracted from one-half of the variable PHASE to provide the variable TEMP3. The value of the variable TEMP3 represents the phase shift between the 1500 Hz reference carrier and the data signal at the present zero crossing.

Proceeding to decision block 521, a check is made to see if the present zero crossing of the data signal is a falling data edge. This could be done several different ways. For example, microcomputer 103 may read the binary state of the limited data signal, waveform 202 in FIG. 2, or simply alternate the state of a variable between one and zero for each zero crossing, as is done with the variable FALL in the program in the Appendix. If the present zero crossing is a falling data edge, YES branch is taken to block 523 where 128 or Pi is added to the variable TEMP3. Otherwise, NO branch is taken to block 525 where 64 or Pi/2 is added to the variable TEMP3. The operation in block 525 adjusts the value of the variable TEMP3 so that a phase shift of 0° is indicated by a value near +64 and a phase shift of ±180° is indicated by a value near −64. Next, at block 527, the sign of the variable TEMP3 is changed depending on the value of the variable OVFL, which was set at block 505. Since all variables have been assumed to be eight-bit signed numbers, the most significant bit of each variable is a sign bit. Due to the scaling adjustment made to the variable TEMP3 in block 525, the phase state of the present bit can be expressed in binary simply by using the sign bit of the variable TEMP3. Thus, if the sign bit of the variable TEMP3 is a binary zero, a binary zero phase state is detected. Similarly, if the sign bit of the variable TEMP3 is a binary one, a binary one phase state is detected. These bits are the phase states of the data signal. Another part of the program can store these binary phase states for later use. The use of these binary phase states depends on how the data signal was modulated. For example, if MSK was employed to modulate the exclusive-OR of adjacent data bits of the data signal (see FIG. 8), then these stored binary phase states represent the binary state of recovered data bits with a possible data inversion. The same is true if OK-QPSK was used to modulate the data signal (see FIG. 6). However, if MSK was used to directly modulate the data signal (see FIG. 7), the difference must be taken between the phase shift for the present bit and the phase shift for the previous bit. This is done at block 529, where the variable TEMP4 is the difference between the variable TEMP3, the phase shift for the present bit, and the variable LTEMP3, the phase shift for the previous bit. After generating the new value of the variable TEMP4, the variable LTEMP3 is set to be equal to TEMP3 for processing the next bit. Thus, for an MSK encoded data signal, the binary states indicated by the sign bit of the variable TEMP4 represent the binary states of recovered data bits, there being no possible data inversion.

Regardless of the type of encoding utilized, a possible data inversion can be eliminated by including a predetermined synchronizing pattern ahead of the information in the data signal. Microcomputer 103 can compare the received synchronizing pattern to a stored synchronizing pattern for resolving the possible data inversion.

In summary, an inventive coherent MSK or OK-QPSK signal demodulator has been described that recovers the data carried by an MSK or OK-QPSK data signal solely by measuring the elapsed time indicated by a timer at discrete times corresponding to the zero crossings of the data signal. The inventive demodulator can be implemented by extraction and detection apparatus utilizing conventional electrical circuit components, or by process steps performed by an interrupt driven microcomputer. When implemented with a microcomputer such as the Motorola M6801 type microcomputer, the process steps of the present invention require only 40–50% of the microcomputer's execution time for demodulating a 1200 baud data signal, thus freeing a majority of the microcomputer's execution time for other functions. The demodulator of the present invention may be advantageously utilized in any suitable data communication system, such as, for example, the communication system described in U.S. Pat. No. 4,156,867, where it is desired to reliably transmit MSK or OK-QPSK data signals between a central station and a plurality of mobile or fixed remote stations.

APPENDIX

The following program has been coded from the flow charts in FIGS. 4 and 5 in BASIC programming language, which is described in the book entitled *Basic BASIC*, by James S. Coan, published by the Hayden Book Co., Inc., Rochelle Park, New Jersey, 1970. The program is included to demonstrate that the flow charts in FIGS. 4 and 5 may be readily coded into any suitable programming language.

All arithmetic operations are performed modulo B. This can be performed naturally if $Log_2 B$ is the number of bits used to express each variable, i.e., eight-bit variables and B=256. Since B is 28, any suitable eight-bit microcomputer can be utilized. On any machine modulo B arithmetic may be simulated by restricting all arithmetic results to a range of size B. In the following example in BASIC, an arithmetic result may be restricted to the range $B/2 > X \geq -B/2$ by the lines:

$x = x + y$; arithmetic operation
if $x \geq B/2$ then $x = x - B$; or
if $x < -B/2$ then $x = x + B$; restrict result.

It can be seen that the result of adding or subtracting two numbers within the range $(B/2 > X \geq -B/2)$ can result in an answer outside the range. When this occurs, it is called arithmetic overflow. The occurrence of overflow can be easily determined in BASIC with the following program:

```
overflow = 0
x = x + y; arithmetic operation
if x ≧ B/2 then overflow = 1; or
if x < -B/2 then overflow = 1; detect overflow.
```

An overflow condition like this is usually detected in a condition code register of most conventional microcomputers.

The following program assumes arithmetic operations are restricted to the range $B/2 > X \geq -B/2$ and overflow is detectable. Line numbers have only been assigned to lines of the following program which correspond to blocks of the flow charts in FIGS. 4 and 5.

|     | REM INTERRUPT ROUTINE |
| --- | --- |
| 401 | READ TIMER |
| 403 | LAST2 = LAST1 |
|     | LAST1 = LAST |
|     | LAST = TIMER - CLOCK |
|     | FALL = ABS (FALL - 1) |
| 405 | IF (LAST2 - LAST) > 43 THEN 409 |
| 407 | TEMP1 = 2*LAST1 |
|     | PDELTA = 6*K |
|     | CDELTA = -2*K |
|     | GO TO 411 |
| 409 | TEMP1 = 3*LAST1 |
|     | PDELTA = -6*K |
|     | CDELTA = 3*K |
| 411 | IF TEMP1 > PHASE THEN 415 |
| 413 | PDELTA = -PDELTA |
|     | PDELTA = -CDELTA |
| 415 | PHASE = PHASE + PDELTA |
|     | CLOCK = CLOCK + CDELTA |
| 417 | TEMP5 = LAST - LAST1 |
|     | IF OVERFLOW = 0 THEN return |
|     | REM DEMODULATION ROUTINE |
| 503 | TEMP5 = PHASE - LPHASE |
|     | IF OVERFLOW = 1 THEN OVFL = -OVFL |
| 507 | LPHASE = PHASE |
| 509 | IF LAST < 96 THEN 513 |
| 511 | TEMP2 = LAST1 |
|     | GO TO 519 |
| 513 | IF LAST < 32 THEN 515 |
| 517 | TEMP2 = (LAST1 + 102)/2 + LAST/2 |
|     | GO TO 519 |
| 515 | TEMP2 = LAST |
| 519 | TEMP2 = 10*TEMP2/8 |
|     | TEMP3 = PHASE/2 - TEMP2 |
| 521 | IF FALL = 1 THEN TEMP3 = TEMP3 + 128 |
| 525 | TEMP3 = (TEMP3 + 64)*OVFL |
| 529 | TEMP4 = TEMP3 - LTEMP3 |
|     | LTEMP3 = TEMP2 |
| 531 | RETURN |

The sign bit of TEMP3 is the binary state of the data if the data signal is coded by OK-QPSK or first exclusive-ORed and then coded by MSK.

The sign bit of TEMP4 is the binary state of the recovered data if the data signal is directly coded by MSK.

I claim:

1. A method of recovering phase states of a signal carrying binary data at a predetermined bit rate and for each bit consisting of one of two signalling tones having successive zero crossings, the frequency difference between the two signalling tones being one-half of the bit rate, and the phase of the data signal being continuous at the boundaries between bits, said method comprising the steps of:

extracting at discrete times coinciding with zero crossings of the data signal a phase shift signal at said discrete times, a clock offset signal indicating the position of bit boundaries and a phase intercept signal indicating the phase of the data signal at the bit boundaries; and detecting at one of said discrete times during each bit one of two phase states, a first phase state detected when the phase shift signal at said one discrete time is substantially equal to the phase intercept signal, and a second phase state detected when the phase shift signal at said one discrete time is substantially equal to the phase intercept signal shifted by 180°.

2. The method according to claim 1, wherein said extracting step further includes the steps of:
generating a timing signal indicating elapsed time;
detecting the zero crossings of the data signal;
generating the phase shift signal by subtracting the clock offset signal from the timing signal when each zero crossing is detected;
storing the phase shift signal;
changing the magnitude of clock offset signal by a predetermined amount dependent on the phase intercept signal and the phase shift signal; and
changing the magnitude of the phase intercept signal by a predetermined amount dependent on the phase intercept signal and the phase shift signal.

3. The method according to claim 1, wherein said detecting step further includes the steps of storing the phase shift signal, comparing each stored phase shift signal to the clock offset signal to detect the first zero crossing past the start of each bit, and selecting the stored phase shift signal for the closer of the previous zero crossing and the present zero crossing to the start of a bit, said detecting step being performed with the selected phase shift signal.

4. The method according to claim 3, wherein said comparing step further includes the step of averaging the previously stored phase shift signal and the presently stored phase shift signal when the previously and presently stored phase shift signals have corresponding zero crossings that are substantially equidistant from the beginning of a bit.

5. The method according to claim 3, wherein said detecting step further includes the steps of storing the phase intercept signal and comparing the previously stored phase intercept signal to the presently stored phase intercept signal for detecting a predetermined phase discontinuity therebetween, said detecting step responsive to detection of the phase discontinuity for providing the second phase state when the selected phase shift signal is substantially equal to the phase intercept signal and the first phase state when the selected phase shift signal is substantially equal to the phase intercept signal shifted by 180°.

6. The method according to claim 3, wherein said detecting step further includes the step of subtracting the selected phase shift signal from the phase intercept signal to provide a normalized phase shift signal, said detecting step providing a first phase state when the normalized phase shift signal is substantially equal to 0° and a second phase state when the normalized phase shift signal is substantially equal to ±180°.

7. The method according to claim 6, wherein said detecting step further includes the step of shifting the normalized phase shift signal by 90°, said detecting step providing a first phase state when the normalized phase shift signal is substantially equal to 90° and a second phase state when the normalized phase shift signal is substantially equal to −90°.

8. The method according to claim 3, wherein said extracting step includes the step of generating an edge signal alternating between first and second states in response to the zero crossings of the data signal, and said selecting step further includes the step of shifting the selected phase shift signal by 180° in response to the second state of the edge signal.

9. The method according to claim 2, further including the steps of comparing the stored phase shift signal for the present zero crossing to the stored phase shift signal for the second previous zero crossing, and selecting a first set of predetermined constants if the compared signals differ by more than a predetermined amount and a second set of predetermined constants if the compared signals do not differ by more than the predetermined amount, said clock offset signal changing step changing the magnitude of the clock offset signal by a predetermined amount dependent upon the phase intercept signal, previous stored phase shift signal and the selected one of said first and second sets of predetermined constants, and said phase intercept signal changing step changing the magnitude of the phase intercept signal by a predetermined amount dependent upon the phase intercept signal, previous stored phase shift signal and the selected one of said first and second sets of predetermined constants.

10. The method according to claim 9, wherein said clock offset signal changing step further includes the step of limiting the magnitude of the change in the clock offset signal to a predetermined range of magnitudes, and said phase intercept signal changing step further includes the step of limiting the magnitude of the change in the phase intercept signal to a predetermined range of magnitudes.

11. A phase state demodulator for a signal carrying binary data at a predetermined bit rate and for each bit consisting of one of two signalling tones having successive zero crossings, the frequency difference between the two signalling tones being one-half of the bit rate, and the phase of the data signal being continuous at the boundaries between bits, said phase state demodulator comprising:
  means for extracting at discrete times coinciding with zero crossings of the data signal a phase shift signal at said discrete times, a clock offset signal indicating the position of bit boundaries and a phase intercept signal indicating the phase of the data signal at the bit boundaries; and
  means for detecting at one of said discrete times during each bit one of two phase states, a first phase state detected when the phase shift signal at said one discrete time is substantially equal to the phase intercept signal, and a second phase state detected when the phase shift signal at said one discrete time is substantially equal to the phase intercept signal shifted by 180°.

12. The demodulator according to claim 11, wherein the binary data is pre-coded by exclusive-OR gating means, said exclusive-OR gating means combining adjacent bits of the binary data, and said demodulator demodulating the pre-coded binary data carried by the data signal and the detected phase states corresponding to the binary states of the data carried by the data signal.

13. The demodulator according to claim 11, wherein said data signal is modulated according to minimum-shift keying, said demodulator further including exclusive-OR gating means for combining the present and previous phase states to provide the binary state of each bit of the data signal.

14. Apparatus for extracting at discrete times a clock offset signal and a phase shift intercept signal from a signal carrying binary data of a predetermined bit rate and for each bit consisting of one of two signalling tones having successive zero crossings, the frequency difference between the two signalling tones being one-half of the bit rate, and the phase of the data signal being continuous at the boundaries between bits, said extraction apparatus comprising:
  means for generating a timing signal having a magnitude indicating elapsed time;
  means for detecting the zero crossings of the data signal;
  first means for subtracting the magnitude of the timing signal from a clock offset signal in response to detection of each zero crossing to provide a phase shift signal;
  first means for storing the phase shift signal in response to detection of each zero crossing;
  second means coupled to the first storing means for storing the previously stored phase shift signal in response to detection of each zero crossing;
  second means for subtracting the phase shift signal from the signal stored in the second storing means to provide a first output signal;
  first means for comparing the first output signal to a first predetermined number and generating an enable signal having a first state if the first output signal has a magnitude greater than that of the first predetermined number and a second state if the first output signal has a magnitude less than that of the first predetermined number;
  first means for multiplying the signal stored in the first storing means by a second predetermined number in response to the first state of the enable signal and a third predetermined number in response to the second state of the enable signal to provide a second output signal;
  third means for subtracting a stored phase intercept signal from the second output signal and providing a third output signal having a predetermined positive magnitude if the second output signal has a magnitude greater than that of the stored phase intercept signal and providing the third output signal having a predetermined negative magnitude if the second output signal has a magnitude less than that of the stored phase intercept signal;
  second means for multiplying the third output signal by a fourth predetermined number in response to the first state of the enable signal and by a fifth predetermined number in response to the second state of the enable signal to provide an incremental clock offset signal;
  first means for adding the incremental clock offset signal to the stored clock offset signal to provide the present clock offset signal;
  third means for storing the present clock offset signal in response to detection of each zero crossing;
  third multiplying means for multiplying the third output signal by a sixth predetermined number in response to the first state of the enable signal and by a seventh predetermined number in response to the second state of the enable signal to provide an incremental phase intercept signal;

second means for adding the incremental phase intercept signal to the stored phase intercept signal to provide the present phase intercept signal; and fourth means for storing the present phase intercept signal in response to detection of each zero crossing.

15. A method for recovering a clock offset signal and phase intercept signal from a signal carrying binary data at a fixed bit rate and for each bit interval consisting of one of two signalling tones having successive zero crossings, the frequency difference between the two signalling tones being one-half of the bit rate, and the phase of the data signal being continuous at the boundaries between bits, said method comprising the steps of:

generating a timing signal indicating elapsed time;
detecting the zero crossings of the data signal;
generating a phase shift signal by subtracting a clock offset signal from the timing signal when each zero crossing is detected;
storing the phase shift signal;
comparing the stored phase shift signal for the present zero crossing to the stored phase shift signal for the second previous zero crossing;
selecting a first set of predetermined constants if the compared signals differ by more than a predetermined amount and a second set of predetermined constants if the compared signals do not differ by more than the predetermined amount;
generating an incremental clock offset signal using a previous phase intercept signal, previous stored phase shift signal and the selected one of said first and second sets of predetermined constants;
adding the incremental clock offset signal to a previous clock offset signal to provide the clock offset signal;
generating an incremental phase intercept signal using the previous phase intercept signal, previous stored phase shift signal and the selected one of said first and second sets of predetermined constants; and
adding the incremental phase intercept signal to the previous phase intercept signal to provide the phase intercept signal.

16. The method according to claim 15, wherein said incremental clock offset signal generating step further includes the step of limiting the magnitude of the incremental clock offset signal to a predetermined range of magnitudes, and the incremental phase intercept signal generating step further includes the step of limiting the magnitude of the incremental phase intercept signal to a predetermined range of magnitudes.

17. A method of recovering phase states of a signal carrying binary data at a predetermined bit rate and for each bit consisting of one of two signalling tones having successive zero crossings, the frequency difference between the two signalling tones being one-half of the bit rate, and the data signal having phase continuity at the boundaries between bits and having a predetermined phase intercept and predetermined clock offset at the bit boundaries, said method comprising the steps of:

extracting at discrete times coinciding with zero crossings of the data signal a phase shift signal indicating the phase shift of the data signal with respect to a predetermined reference carrier signal; and
detecting at one of said discrete times during each bit one of two phase states, a first phase state detected when the phase shift signal at said one discrete time is substantially equal to the phase intercept signal, and a second phase state detected when the phase shift signal at said one discrete time is substantially equal to the phase intercept signal shifted by 180°.

18. The method according to claim 17, wherein said detecting step further includes the steps of storing the phase shift signal, comparing each stored phase shift signal to the predetermined clock offset to detect the first zero crossing past the start of each bit, and selecting the stored phase shift signal for the closer of the previous zero crossing and the present zero crossing to the start of a bit, said detecting step being performed with the selected stored phase shift signal.

19. The method according to claim 18, wherein said comparing step further includes the step of averaging the previously stored phase shift signal and the presently stored phase shift signal when the previously and presently stored phase shift signals have corresponding zero crossings that are substantially equidistant from the beginning of a bit.

20. A system for communicating data signals between at least two stations, each data signal carrying binary data at a fixed bit rate and for each bit interval consisting of one of two signalling tones having successive zero crossings, the frequency difference between the two signalling tones being one-half of the bit rate, and the phase of the data signal being continuous at the boundaries between bits, said communication system comprising:

(A) a communication channel for carrying data signals applied thereto;
(B) a first station including:
 (i) a data signal source for generating the data signal having a plurality of binary bits;
 (ii) exclusive-OR gating means for combining adjacent bits of the data signal to provide a combined data signal;
 (iii) means for modulating the combined data signal according to minimum-shift keying; and
 (iv) means for applying the modulated data signal to the communication channel; and
(C) a second station including:
 (i) means for receiving the modulated data signal from the communication channel; and
 (ii) demodulating means comprising:
  (a) means for amplifying the received data signal to provide transitions between first and second voltage levels at each zero crossing of the received data signal;
  (b) means for generating a timing signal indicating elapsed time;
  (c) processing means responsive to the transitions of the amplified data signal for storing a phase shift signal generated by subtracting a clock offset signal from the timing signal, generating the clock offset signal indicating the position of the start of each bit of the data signal with respect to the timing signal and generating a phase intercept signal indicating the phase of the data signal at the beginning of each bit; said processing means further detecting the first transition of the amplified data signal after the start of each bit, selecting the stored phase shift signal of the transition closest to the start of the bit, detecting a first binary state for a bit of the data signal when the selected phase shift signal is substantially equal to the phase intercept signal, and detecting a second binary state for a bit of the data signal when the selected phase shift signal is substantially equal to the phase intercept signal shifted by 180°.

21. The method according to claim 18, wherein said detecting step further includes the step of subtracting the selected phase shift signal from the predetermined phase intercept to provide a normalized phase shift signal, said detecting step providing a first phase state when the normalized phase shift signal is substantially equal to 0° and a second phase state when the normalized phase shift signal is substantially equal to ±180°.

22. The method according to claim 21, wherein said detecting step further includes the step of shifting the normalized phase shift signal by 90°, said detecting step providing a first phase state when the normalized phase shift signal is substantially equal to 90° and a second phase state when the normalized phase shift signal is substantially equal to −90°.

23. The method according to claim 18, wherein said extracting step includes the step of generating an edge signal alternating between first and second states in response to the zero crossings of the data signal, and said selecting step further includes the step of shifting the selected phase shift signal by 180° in response to the second state of the edge signal.

24. A communication system comprising:
(a) a communication channel for carrying data signals applied thereto;
(b) transmitting means comprising:
    (i) means for modulating a signal with binary data at a fixed bit rate by generating one of two signalling tones for each bit, the signalling tones having successive zero crossings and a frequency difference that is one-half of the bit rate, and the phase of the data signal being continuous at the boundaries between bits;
    (ii) means for applying the data signal to the communication channel; and
(c) means for demodulating phase states of the data signal, said demodulating means comprising:
    (i) means for receiving the data signal from the communication channel;
    (ii) means for extracting at discrete times coinciding with zero crossings of the data signal a phase shift signal at said discrete times, a clock offset signal indicating the position of the bit boundaries and a phase intercept signal indicating the phase of the data signal at the bit boundaries; and
    (iii) means for detecting at one of said discrete times during each bit one of two phase states, a first phase state detected when the phase shift signal at said one discrete time is substantially equal to the phase intercept signal, and a second phase state detected when the phase shift signal at said one discrete time is substantially equal to the phase intercept signal shifted by 180°.

25. A phase state demodulator for a signal carrying binary data at a fixed bit rate and for each bit interval consisting of one of two signalling tones having successive zero crossings, the frequency difference between the two signalling tones being one-half of the bit rate, and the phase of the data signal being continuous at the boundaries between bits, said demodulating apparatus comprising:
means for amplifying the data signal to provide transitions between first and second voltage levels at each zero crossing of the data signal;
means for generating a timing signal indicating elapsed time;
processing means responsive to the transitions of the amplified data signal for storing a phase shift signal generated by subtracting a clock offset signal from the timing signal, generating the clock offset signal indicating the position of the start of each bit of the data signal with respect to the timing signal and generating a phase intercept signal indicating the phase of the data signal at the beginning of each bit; said processing means further detecting the first transition of the amplified data signal after the start of each bit, selecting the stored phase shift signal of the transition closest to the start of the bit, detecting a first phase state when the selected phase shift signal is substantially equal to the phase intercept signal, and detecting a second phase state when the selected phase shift signal is substantially equal to the phase intercept signal shifted by 180°.

26. The demodulator according to claim 25, wherein said timing signal generating means includes means for generating a clock signal having a frequency that is n times the bit frequency, where n is an integer number greater than one, and counting means responsive to the clock signal for providing the timing signal that linearly varies between zero and $2^n$.

27. The demodulator according to claim 25, wherein the binary data is pre-coded by exclusive-OR gating means, said exclusive-OR gating means combining adjacent bits of the binary data, and said demodulator demodulating the pre-coded binary data carried by the data signal and the detected phase states corresponding to the binary states of the data carried by the data signal.

28. The demodulator according to claim 25, wherein said data signal is modulated according to minimum-shift keying, said processing means further including means for taking the exclusive-OR of the present and previous phase states to provide the binary state of each bit of the data signal.

29. A system for communicating data signals between at least two stations, each data signal carrying binary data at a fixed bit rate and for each bit interval consisting of one of two signalling tones having successive zero crossings, the frequency difference between the two signalling tones being one-half of the bit rate, and the phase of the data signal being continuous at the boundaries between bits, said communication system comprising:
(A) a communication channel for carrying data signals applied thereto;
(B) a first station including:
    (i) a data signal source for generating the data signal having a plurality of binary bits;
    (ii) means for modulating the data signal according to minimum-shift keying; and
    (iii) means for applying the modulated data signal to the communication channel; and
(C) a second station including:
    (i) means for receiving the modulated data signal from the communication channel; and
    (ii) demodulating means comprising:
        (a) means for amplifying the received data signal to provide transitions between first and second voltage levels at each zero crossing of the received data signal;
        (b) means for generating a timing signal indicating elapsed time;

(c) processing means responsive to the transitions of the amplified data signal for storing a phase shift signal generated by subtracting a clock offset signal from the timing signal, generating the clock offset signal indicating the position of the start of each bit of the data signal with respect to the timing signal and generating a phase intercept signal indicating the phase of the data signal at the beginning of each bit; said processing means further detecting the first transition of the amplified data signal after the start of each bit, selecting the stored phase shift signal of the transition closest to the start of the bit, detecting a first phase state when the selected phase shift signal is substantially equal to the phase intercept signal, detecting a second phase state when the selected phase shift signal is substantially equal to the phase intercept signal shifted by 180°, and taking the exclusive-OR of the present and previous phase states to provide the binary state of each bit of the data signal.

30. A system for communicating data signals between at least two stations, each data signal carrying binary data at a fixed bit rate and for each bit interval consisting of one of two signalling tones having successive zero crossings, the frequency difference between the two signalling tones being one-half of the bit rate, and the phase of the data signal being continuous at the boundaries between bits, said communication system comprising:

(A) a communication channel for carrying data signals applied thereto;
(B) a first station including:
  (i) a data signal source for generating the data signal having a plurality of binary bits;
  (ii) means for modulating the data signal according to offset-keyed quadrature-phase-shift keying; and
  (iii) means for applying the modulated data signal to the communication channel; and
(C) a second station including:
  (i) means for receiving the modulated data signal from the communication channel; and
  (ii) demodulating means comprising:
    (a) means for amplifying the received data signal to provide transitions between first and second voltage levels at each zero crossing of the received data signal;
    (b) means for generating a timing signal indicating elapsed time;
    (c) processing means responsive to the transitions of the amplified data signal for storing a phase shift signal generated by subtracting a clock offset signal from the timing signal, generating the clock offset signal indicating the position of the start of each bit of the data signal with respect to the timing signal and generating a phase intercept signal indicating the phase of the data signal at the beginning of each bit; said processing means further detecting the first transition of the amplified data signal after the start of each bit, selecting the stored phase shift signal of the transition closest to the start of the bit, detecting a first binary state for a bit of the data signal when the selected phase shift signal is substantially equal to the phase intercept signal, and detecting a second binary state for a bit of the data signal when the selected phase shift signal is substantially equal to the phase intercept signal shifted by 180°.

* * * * *